United States Patent [19]

Harada et al.

[11] Patent Number: 4,625,710
[45] Date of Patent: Dec. 2, 1986

[54] HOLLOW STRUCTURE PANEL FOR HEAT STORAGE MATERIAL AND PROCESS FOR PRODUCING HEAT STORAGE MATERIAL PANEL USING THE SAME

[75] Inventors: Mithuhiro Harada, Tokyo; Kenji Saita, Niihama, both of Japan

[73] Assignee: Sumitomo Chemical Company, Limited, Osaka, Japan

[21] Appl. No.: 745,235

[22] Filed: Jun. 17, 1985

[30] Foreign Application Priority Data

Jun. 21, 1984 [JP] Japan ................... 59-128535

[51] Int. Cl.⁴ .............. F24J 3/00; F24J 2/00
[52] U.S. Cl. .................. 126/430; 126/436; 126/452
[58] Field of Search ............ 126/430, 436, 452; 52/806, 808; 428/117, 116, 593

[56] References Cited

U.S. PATENT DOCUMENTS

| | | | |
|---|---|---|---|
| 3,501,367 | 3/1970 | Parker | 52/808 |
| 3,769,767 | 11/1973 | Scott | 52/806 |
| 3,895,152 | 7/1975 | Carlson et al. | 52/806 |
| 4,162,341 | 7/1979 | Norton | 428/117 |
| 4,250,958 | 2/1981 | Wasserman | 126/430 |
| 4,251,579 | 2/1981 | Lee et al. | 428/117 |
| 4,258,696 | 3/1981 | Gopal | 126/430 |
| 4,273,100 | 6/1981 | Cogliano | 126/430 |
| 4,290,416 | 9/1981 | Maloney | 126/430 |
| 4,510,921 | 4/1985 | Yano et al. | 126/430 |
| 4,531,511 | 7/1985 | Hochberg | 126/430 |
| 4,556,100 | 12/1985 | Whitman | 126/430 |
| 4,565,242 | 1/1986 | Yano et al. | 126/430 |

FOREIGN PATENT DOCUMENTS

| | | | |
|---|---|---|---|
| 3130295 | 6/1983 | Fed. Rep. of Germany | 126/430 |
| 56910 | 7/1967 | German Democratic Rep. | 52/806 |
| 35293 | 2/1982 | Japan | 126/436 |
| 7709979 | 3/1979 | Netherlands | 126/430 |

OTHER PUBLICATIONS

"Phase-Change Products for Passive Homes", Kohler et al., *Solar Age*, May 1983, pp. 65-69.
"Suspension Media for Heat Storage Materials", Day Chahroudi, Proc. of the Workshop on Solar Energy Subsystems for Heating and Cooling of Buildings, Charlottesville, Va., Apr. 16-18, 1975, pp. 56-59.

*Primary Examiner*—Melvyn J. Andrews
*Assistant Examiner*—John J. Zimmerman
*Attorney, Agent, or Firm*—Stevens, Davis, Miller & Mosher

[57] ABSTRACT

A hollow plate-like panel comprising at least two face plates spaced apart at a given distance from each other and a core member composed of a plurality of unit cells and sandwiched between the face plates, at least one hole being provided in at least one face plate and each unit cell having at least two holes communicating with adjoining unit cells, is suitable for filling a solidifiable heat storage material to give a heat storage material panel with high strength and durability.

1 Claim, 8 Drawing Figures

HOLLOW STRUCTURE PANEL FOR HEAT STORAGE MATERIAL AND PROCESS FOR PRODUCING HEAT STORAGE MATERIAL PANEL USING THE SAME

BACKGROUND OF THE INVENTION

This invention relates to a hollow plate-like structure which can be made into a heat storage material panel by filling therein a solidifiable heat storage material, and a process for producing a heat storage material panel by using said hollow plate-like structure which panel is easy to handle for transportation, working, etc., excellent in strength, durability and heat conductivity and usable for a variety of purposes.

Extensive studies have been made in recent years on the use of heat storage material as a means for utilization of solar energy, regeneration of waste heat or control of residential environment. Generally, there are two ways for effecting heat storage by using such a heat storage material: one way is to make use of sensible heat of the material and the other way is to utilize latent heat. A typical example of the former way comprises the use of water, crushed stone, brick, concrete or the like as heat storage material. This method, however, has several drawbacks. For example, a substantial increment in volume or weight of the heat storage material is required for increasing the amount of heat stored. Also a drop of temperature of the heat storage material itself is caused upon release of heat. This method is therefore limited in its scope of application. On the other hand, in the case of the latter way in which latent heat of the material is utilized, a typical method comprises the use of an inorganic salt hydrate or an organic crystalline material. This method takes advantage of the phenomenon of phase change by melting and solidification of the material which takes place at a given temperature. This method is advantageous in that the heat of a constant temperature can be utilized and that the portion of the system composed of the heat storage material can be reduced in size to allow a compact design because of the small temperature change of the heat storage material in accordance with storage and release of heat and the large volume of latent heat build up at the time of melting and solidification of the material.

With respect to heat storage performance and durability of the solidifiable heat storage material used in said method utilizing latent heat, the material, shape, etc., of the container used for filling the solidifiable heat storage material, as well as properties of such heat storage material, become very important factors. Such a container is required to have enough strength and durability to stand use under any environment and conditions of practical use, to have good heat conductivity to allow easy accumulation and release of heat, to provide an anticorrosive protection for the solidifiable heat storage material filled therein and to be easy to handle for transportation, working, etc., and easy to fill with the solidifiable heat storage material. Low cost is also an important requirement.

None of the hitherto available containers of solidifiable heat storage material can meet all of these requirements. In the prior art (Solar Age, May, 1983, pp. 66–69), there have been used stainless steel made cans or cylindrical containers, or plastic made cases or cylindrical containers designed to be filled with a solidifiable heat storage material in an airtight way, but all of these prior art containers involved various problems in practical use such as insufficient strength and durability, improper shape for heat transfer, difficulty in handling for transportation, working and other purposes.

SUMMARY OF THE INVENTION

An object of this invention is to provide a hollow plate-like structure for heat storage material panel having in its inside an assemblage of a plurality of cells, said plate-like structure being free of said problems of the prior art, excellent in strength, durability and heat conductivity, easy to handle and applicable to a wide range of use.

Another object of this invention is to provide a method for producing a heat storage material panel using said hollow plate-like structure having in its inside an assemblage of a plurality of cells each of which is provided with at least two holes allowing a solidifiable heat storage material to flow therethrough and also having at least one hole for evacuating the structure and for filling the heat storage material therein, wherein the air in the structure is evacuated from said hole(s) and concurrently with or after the evacuation, the solidifiable heat storage material is supplied and filled in the structure from the hole(s) provided at other part(s) of the structure or from the hole used for the evacuation.

In accordance with this invention, there is provided a hollow plate-like structure for heat storage material panel comprising at least two face plates spaced apart at a given distance from each other and a core member composed of an assemblage of a plurality of unit cells and sandwiched between said face plates, at least one of said face plates having at least one hole and each unit cell in said core member having at least two holes communicating with adjoining unit cells.

In accordance with this invention, there is further provided a method for producing a heat storage material panel using said hollow plate-like structure, which comprises evacuating the air in the hollow plate-like structure from at least one hole provided in at least one face plate of said structure, and concurrently with or after the evacuation, supplying a solidifiable heat storage material to fill the structure from one or more other holes or from the hole used for the evacuation.

DESCRIPTION OF THE PREFERRED EMBODIMENTS

The standard form of the hollow plate-like structure in accordance with this invention is a rectangular plate-like body having a uniform thickness. It may, however, be of a form which, when viewed sidewise, is prolonged triangular or prolonged trapezoidal, that is, a form which varies in thickness gradually in the longitudinal direction or may be a form varying in thickness in whatever manner depending on the purpose of use.

Figure 1:
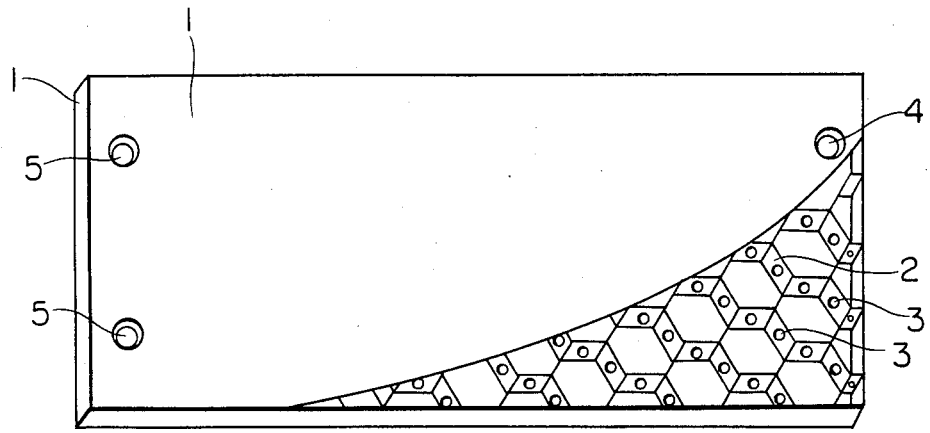
FIG. 1 is a perspective view of an example of hollow plate-like structure in accordance with this invention, intended to show partly the inside formation of the structure.
Figure 2:
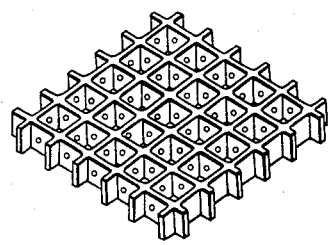
FIG. 2 and FIG. 3 are perspective views showing different designs of the core member of the hollow plate-like structure in accordance with this invention.
Figure 3:
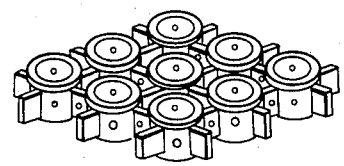
Figure 4:
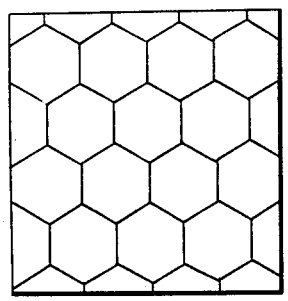
FIG. 4 and FIG. 5 are plane views showing still other designs of core member of the hollow plate-like structure according to this invention.
Figure 5:
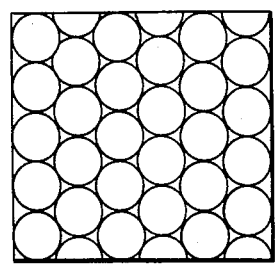

A typical example of hollow plate-like structure in accordance with this invention is illustrated in FIG. 1. The hollow plate-like structure of this embodiment, as illustrated, consists of two (upper and lower) face plates 1 and a core member 2 comprising a plurality of cells assembled to form a honeycomb structure. Each unit cell has holes 3, and each face plate 1 is provided with holes 4 for evacuation and holes 4 for feeding a solidifiable heat storage material into the structure. Although the core is provided in a single layer in the embodiment shown in FIG. 1, the core may be provided in two or more layers in lamination.

Figure 6:
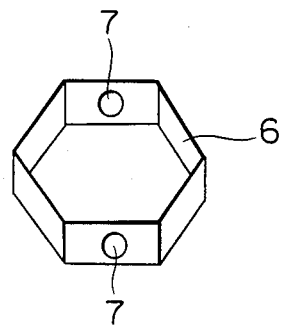
FIG. 6 is a perspective view illustrating a form of holes provided in a unit cell in the core member.

Core 2 consists of a plurality of cells which, in sectional shape, may be polygonal such as triangular, square or hexagonal (forming a so-called honeycomb structure), circular, oval, fan-shaped, or a combined form of circle and polygonal shape. Each unit cell has in its side wall at least two holes through which the solidifiable heat storage material can pass flowingly when such material is filled in the cells. Typical examples of core construction in accordance with this invention are illustrated in FIGS. 2 to 5. The shape, position and size of the holes provided in the side wall of each unit cell are not critical. They may be properly decided depending on the flow characteristic of the solidifiable heat storage material to be filled, so as to meet the requirement that said material be able to pass flowingly through said holes into the respective unit cells in the core member. The number of the holes per unit cell should be two at least because only one hole in one cell, though allowing filling of the material into one cell, doesn't enable flowing of the material into other unit cells. If the solidifiable heat storage material used in this invention is low in viscosity and easy to flow, it is possible to fill the material in the hollow plate-like structure in a short time with a small number of holes per cell and a small size of holes. In case of using a heat storage material which is high in viscosity and poor in fluidity, it is advisable to increase the number of holes per cell and to enlarge the hole size for facilitating the filling. A preferred example of construction of cell hole is illustrated in FIG. 6 in which numeral 6 designates a unit cell of the honeycomb structure and 7 denotes two circular holes provided in the side wall of a unit cell.

Face plates 1 constitute both front and rear surfaces and, if necessary, the outer side wall of the hollow plate-like structure may be made. The hollow plate-like structure is usually in the form of a flat plate, but if necessary it may take the form of a corrugated plate. A core member is sandwiched between said face plates to form covered cells. Holes in the external surfaces of the hollow plate-like structure are provided in both front and rear surfaces or side faces or at the joints thereof. These holes are designed to be used for evacuation of the structure and for filling of the solidifiable heat storage material in the structure. The number of the holes provided is one at least. To have two or more holes in the face plates is preferable. In such a case, at least two holes among many holes are preferably placed oppositely at both end portions of the face plate. When the holes are provided in such a manner, the evacuation of air can be conducted easily at the time of filling the solidifiable heat storage material.

The size of the holes should be properly decided depending on the size of the hollow plate-like structure and flow characteristics of the solidifiable heat storage material to be filled in the cells. The shape of the holes is not particularly specified; any shape will do so long as easy filling of the heat storage material and easy sealing of the holes after filling are assured.

The solidifiable heat storage material used in this invention is normally solid and shows a certain degree of strength in this state, but when melted, it exhibits a flowing behavior and hence no strength can be expected in this state. Therefore, considering the easiness in handling of the structure for transportation, working, etc., and its durability, it is required that the container itself of the heat storage material has enough strength to stand all possible use conditions. The hollow plate-like structure used in this invention is characterized by its extremely high strength inspite of the thin face plates, owing to the presence of the core. Also, the structure has good heat conductivity because of the thin face plates. Generally, solidifiable heat storage materials are poor in heat conductivity, so that in order to allow efficient storage and release of heat, it is necessary to reduce the thickness of the material to a certain degree. A lamellar structure such as the device of this invention is best suited for such a purpose. The plate-like structure of this invention has in itself very high strength, so that a plurality of heat storage material panels can be piled up densely and to a great height for transportation. Also, the panel is not deformed or damaged even if a person treads on it during execution of works.

Such heat storage material panel can be used as a construction material having a heat storage performance, for example, as a principal structural member of a heat storage tank in a solar power system or as a building material to be used for the purpose of environmental control in the interior of a residence such as flooring, walls, ceiling, etc., of a residence. Further, the heat storage material panel in accordance with this invention has good shape retainability and is high in strength and lamellar in structural form, so that a plurality of such panels can be arranged in a desired way at given intervals with simple supports or fixing means to constitute a heat storage tank. Also, the panel can be adapted with ease to the floor, wall, ceiling, etc., of a residence, and in practical use for such purposes, it can hold out a fairly high load. The hollow plate-like structure of this invention should have a thickness in the range from 5 mm to 50 mm for effective application. If the thickness of the structure is less than 5 mm, the amount of heat storage material filled may prove too small to provide the desired effect, and if the structure thickness exceeds 50 mm, the heat conductivity of the structure is reduced to make the structure unfit for effective storage and release of heat.

The size of unit cells is preferably in the range from 20 mm$^2$ to 10,000 mm$^2$ in terms of average sectional area. Any cell size smaller than 20 mm$^2$ leads to a too large volume of the core with a corresponding decrease of the amount of heat storage material filled. This is also undesirable from the aspect of strength of the heat storage material panel. A cell size exceeding 10,000 mm$^2$ is too large for the intended purpose of use. Also, the panel is reduced in strength to an intolerable degree when the face plates are small in thickness.

The thickness of each face plate is preferably from about 0.1 mm to about 3 mm. Below 0.1 mm, the panel strength is weak, and above 3 mm, heat conductivity is poor.

Plastic, metal, paper or a complex thereof can be used as the material of the hollow plate-like structure of this invention. The plastics usable for the purpose of this invention include single resins or blends thereof, for example, homopolymers or copolymers such as polyethylene, polypropylene, polystyrene, polyvinyl chloride, polymethyl methacrylate, polycarbonate, acrylonitrile-styrene-butadiene copolymer, epoxy resin, diallyl phthalate resin, unsaturated polyesters, etc., or mixtures of these plastics with fibers of glass, carbon, metal or the like.

Iron, aluminum and alloys thereof can be named as typical examples of the metals usable for the purpose of this invention. In case of using paper, it is preferably impregnated or laminated with a resin. These materials can be used either alone or in combination depending on the way of use of the heat storage material panel, environmental conditions, durability, cost and other factors. When using a metal such as mentioned above, it is preferably coated with a plastic for increasing corrosion resistance to the solidifiable heat storage material.

For producing the hollow plte-like structure used in this invention, said face plates and core member are bonded to each other with an ordinary aqueous or solvent-type adhesive or hot-melt adhesive, or they are melted and fused together by means of heating or ultrasonic welding. The core member can be produced by integrally molding a core member of a desired configuration by a suitable molding method such as injection molding, compression molding or cast molding. It is also possible to make the core member of a required configuration by bonding or fusing together the component members of various shapes. Holes in the hollow plate-like structure or in the core member and other minute sections can be worked by machining or other means.

Inorganic salt hydrates or organic crystalline substances can be used as the solidifiable heat storage material in this invention. Examples of such inorganic salt hydrates or organic crystalline substances are $Na_2SO_4.10H_2O$ or mixtures thereof with NaCl, KCl and the like, $CaCl_2.6H_2O$ or mixtures thereof with $MgCl_2.6H_2O$, $MgBr_2.6H_2O$ and the like, $Na_2S_2O_3.5H_2O$, $CH_3COONa.3H_2O$, paraffin ($C_{16}-C_{18}$), polyethylene glycol and the like.

Filling of the solidifiable heat storage material into the hollow plate-like structure of this invention can be effected, for example, in the following way: the air in the interior of the hollow plate-like structure is evacuated by a vacuum pump or an ejector through one or more holes provided in a face plate of said hollow plate-like structure while simultaneously filling a predetermined amount of soldifiable heat storage material from one or more other holes in said face plate under reduced pressure. the solidifiable heat storage material supplied from the holes flows into individual cells in the core member by passing through the holes provided in each cell (at least two holes are provided in each cell) so that the hollow plate-like structure is finally filled with said heat storage material.

Alternatively, the air in the interior of the hollow plate-like structure is first evacuated from one or more holes in a face plate and then the solidifiable heat storage material is supplied into the core member from the hole used for the evacuation and/or one or more holes provided in other parts of the plate-like structure.

In practicing the filling in this invention, a heat storage material filling nozzle and an evacuation nozzle must be properly joined to the holes in the hollow plate-like structure. In accordance with this invention, such joining can be effected by fitting the filling or evacuation nozzle tip to a sucking disc capable of covering the entire hole or to a cover or plug airtightly secured to the hole and pressing the nozzle against the hollow plate-like structure.

In carrying out said filling of the solidifiable heat storage material, a method may be used in which the amount of solidifiable heat storage material that can be filled in the hollow plate-like structure is first weighed and the weighed amount of heat storage material is supplied into the structure. Alternatively, the solidifiable heat storage material may be supplied continuously until the hollow plate-like structure is entirely filled up with said material, the completion of such filling being sensed by a liquid level sensor, whereupon the filling is stopped.

Upon completion of said filling, the holes are sealed up to prevent any leak of the heat storage material in the structure. Such sealing can be effected, for instance, by casting a putty, caulking material, hot-melt resin or the like into the mouth of the hole or by securing a flat plate, odd-shaped cover or plug to the mouth of the hole. In this case, an adhesive or heat or ultrasonic wave can be applied to effect secure bonding or fusion of said cover or plug to the hole.

Figure 7A:
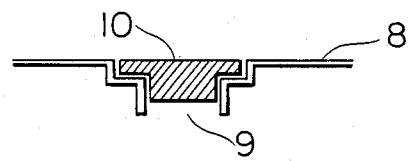
FIG. 7 is a sectional view (a) and a plane view (b) illustrating the construction of the hole provided in a face plate of the hollow plate-like structure in accordance with the present invention.
Figure 7B:
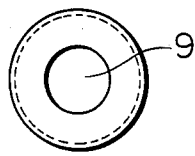

A typical example of construction of the hole in the hollow plate-like structure of this invention and an example of sealing of said hole with a plug are illustrated in FIG. 7, in which reference numeral 8 designates a face plate of the hollow plate-like structure, 9 a hole, and 10 a plug used for sealing the hole. The heat storage material can be filled in the hollow plate-like structure to every nook and corner of each unit cell therein by supplying said material into the plate-like structure while or after evacuating the air in the interior of the structure. No satisfactory filling can be made by an arrangement in which one of the holes is left open to the atmosphere to merely serve as a gas vent and the heat storage material is forced into the structure from one or more other holes, because in such an arrangement air bubbles could remain in the dead space created when the material flows passing through the holes in the cells.

The heat storage material panel in accordance with this invention finds a wide range of use. For instance, it can be advantageously applied to heat storage tanks in various types of solar power systems, heat storage tanks for heat recovery, or as a construction material having a heat storage performance for ceiling, walls, flooring, etc., of a residence or other buildings as an effective means for controlling interior environment. It also finds use as a heat storage material for hot-water type or electrical floor, wall or ceiling heater system. The size of the heat storage material panel in accordance with this invention is not specified; it can be properly decided according to the purpose of use.

EXAMPLE

First, face plates having a thickness of 1 mm and a core member, 1 mm in thickness, of a honeycomb structure consisting of a plurality of hexagonal unit cells having a diagonal length of 30 mm and provided with square holes of about 30 mm in sectional area substantially centrally in four wall faces were injection molded with a polypropylene resin (SUMITOMO NOBLEN® AH-501).

Then said face plates and core member were fusion bonded to make a hollow plate-like structure having the dimensions of 500 mm in length, 300 mm in width and 20 mm in thickness, such as illustrated in FIG. 1, and the holes of about 10 mm in diameter were drilled in the face plate on the surface side, two holes in the left side portion of the face plate and one hole toward the upper end of the right side portion of the face plate.

A plug fitted with a nozzle having a valve was airtightly press fitted to each hole.

Used as the solidifiable heat storage material was liquid $CaCl_2.6H_2O$ prepared in an approximately 3,000 ml cylinder, and the cylinder was connected to two nozzles in the left side portion of the hollow plate-like structure.

The hollow plate-like structure was slightly tilted so that the upper right end of the structure rose up, and the nozzle at this portion was connected to a vacuum pump. The air in the plate-like structure was evacuated to an internal pressure of 650 mmHg by operating the vacuum pump with the valves of the two nozzles in the left side portion of the structure being kept closed.

Then the valves of the two nozzles in the left side portion of the hollow plate-like structure were opened to supply approximately 2,500 ml of solidifiable heat storage material in a period of about 20 seconds.

Thereafter, the plug of the nozzle connected to the vacuum pump was removed, and a polypropylene-made sealing plug (see FIG. 7) was press fitted into the hole and heat sealed by ultrasonic sealing.

Then the left side of the hollow plate-like structure was raised and the two nozzles were removed, the corresponding holes being sealed in the same way as described above.

All of these operations were conducted in a room of about 30° C.

The above-described filling method in accordance with this invention enables very easy, short-time filling of the heat storage material into the hollow plate-like structure having therein a complicated cell assemblage, which has been quite difficult by the conventional methods. Undesirable introduction of air during the filling operation is also minimized. Further, the filling method according to this invention can simplify the mechanism of the filling apparatus, and also the sealing after filling becomes easy as the evacuating hole and the heat storage material charging holes provided in the hollow plate-like structure are relatively small in diameter.

What is claimed is:

1. A method for producing a heat storage material panel, comprising a hollow plate-like structure having at least two face plates spaced apart at a given distance from each other, and a core member composed of an assemblage of a plurality of unit cells and sandwiched between said face plates, at least one hole being provided in at least one end plate, and each unit cell in said core member having at least two holes communicating with adjoining unit cells, which comprises evacuating air from the interior of the hollow plate-like structure through at least one hole provided in at least one face plate of said structure, and concurrently with or after the evacuation, supplying a solidifiable heat storage material to fill the structure through one or more other holes or through the hole used for the evacuation.

* * * * *